US008375544B1

(12) United States Patent
Wilson

(10) Patent No.: US 8,375,544 B1
(45) Date of Patent: Feb. 19, 2013

(54) RAILROAD PIN REMOVAL SYSTEM

(75) Inventor: Timothy R. Wilson, Moorhead, MN (US)

(73) Assignee: Portaco, Inc., Moorhead, MN (US)

( * ) Notice: Subject to any disclaimer, the term of this patent is extended or adjusted under 35 U.S.C. 154(b) by 942 days.

(21) Appl. No.: 12/253,407

(22) Filed: Oct. 17, 2008

(51) Int. Cl.
*B23P 19/027* (2006.01)

(52) U.S. Cl. .................................... 29/243.56; 29/426.6

(58) Field of Classification Search .................... 29/229, 29/426.6, 243.56; 238/338, 310, 315, 316, 238/336, 351, 378; 254/18, 19, 20, 25
See application file for complete search history.

(56) References Cited

U.S. PATENT DOCUMENTS

| | | | | | |
|---|---|---|---|---|---|
| 3,643,918 | A | * | 2/1972 | Ellis | 254/19 |
| 3,746,306 | A | * | 7/1973 | Ellis et al. | 254/19 |
| 3,883,118 | A | * | 5/1975 | Miller | 254/18 |
| 4,373,247 | A | * | 2/1983 | Holenstein et al. | 29/426.6 |
| 5,161,292 | A | * | 11/1992 | Kurtyak et al. | 29/243.56 |
| 5,165,346 | A | * | 11/1992 | Piekarski | 104/17.2 |
| 5,253,844 | A | * | 10/1993 | Cotic et al. | 254/18 |
| 5,392,504 | A | * | 2/1995 | Calusinski | 29/426.6 |
| 5,438,931 | A | * | 8/1995 | Becker et al. | 104/17.2 |
| 5,566,924 | A | * | 10/1996 | Shirk | 254/18 |
| 5,628,102 | A | * | 5/1997 | Johnson | 29/225 |
| 5,661,886 | A | * | 9/1997 | Smith | 29/243.56 |
| 5,839,377 | A | * | 11/1998 | Brenny et al. | 104/17.2 |
| 5,884,381 | A | * | 3/1999 | Calusinski | 29/426.6 |
| 5,924,679 | A | * | 7/1999 | Wilson | 254/18 |
| 6,098,960 | A | * | 8/2000 | Lefavour et al. | 254/18 |
| 6,113,073 | A | * | 9/2000 | Lefavour et al. | 254/18 |
| 6,598,856 | B1 | * | 7/2003 | Puff et al. | 254/18 |
| 6,640,406 | B2 | * | 11/2003 | Wilson | 29/243.56 |
| 6,702,192 | B2 | * | 3/2004 | Igwemezie | 238/338 |
| 6,935,620 | B1 | * | 8/2005 | Wilson | 254/18 |
| 2002/0000475 | A1 | * | 1/2002 | Igwemezie | 238/338 |
| 2003/0150350 | A1 | * | 8/2003 | Wilson | 104/17.2 |
| 2008/0093472 | A1 | * | 4/2008 | Hohne et al. | 238/351 |

* cited by examiner

*Primary Examiner* — Lee D Wilson
*Assistant Examiner* — Jamal Daniel
(74) *Attorney, Agent, or Firm* — Neustel Law Offices

(57) ABSTRACT

A railroad pin removal system for efficiently removing a pin from a base plate of a railroad system so as to free the rail from the base plate. The railroad pin removal system generally includes a frame, an actuator secured to the frame and a clamping mechanism at least partially secured to the actuator, wherein the clamping mechanism is operable via the actuator. The clamping mechanism includes a movable jaw and a fixed jaw to slidably move a railroad pin away from a rail so as to be released from a base plate.

15 Claims, 8 Drawing Sheets

RAILROAD PIN REMOVAL SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to railroad assembly and disassembly devices and more specifically it relates to a railroad pin removal system for efficiently removing a pin from a base plate of a railroad system so as to free the rail from the base plate.

2. Description of the Related Art

Any discussion of the related art throughout the specification should in no way be considered as an admission that such related art is widely known or forms part of common general knowledge in the field.

Railroad systems have been in use for centuries and are generally regarded as an efficient means in which to transport goods, people or livestock over long or short distances. A railroad system generally includes two parallel rails in which the railroad cars or carriages travel along. Ties, which can be comprised of wood, metal or concrete among others, extend between and perpendicularly across the rails to maintain the rails a proper distance apart. Base plates are used to secure the rails to the ties. The base plates are secured atop the ties and include a flat upper surface to receive the rails.

A fastener is used to secure the rails to the base plate, wherein the head or portion of the fastener extends over an outer lip of the rail to clamp the rail down upon the base plate. Traditionally, fasteners may be comprised of spikes, lag bolts or pin clips. The present invention is focused around pin clips (i.e. pins) as utilizing pins allows for an easier insertion and removal of the pins from the base plate and thus an easier installation or removal of the rails from the base plate.

Various problems have still been associated with the removal of the pins in the past, in that a manual force is often used to remove the pins, which may become increasingly tiresome and require a large and costly workforce to remove or perform maintenance upon lengthy sections of railroad track. Because of the inherent problems with the related art, there is a need for a new and improved railroad pin removal system for efficiently removing a pin from a base plate of a railroad system so as to free the rail from the base plate.

BRIEF SUMMARY OF THE INVENTION

The general purpose of the present invention is to provide a railroad pin removal system that has many of the advantages of the railroad assembly and disassembly devices mentioned heretofore. The invention generally relates to a railroad disassembly device which includes a frame, an actuator secured to the frame and a clamping mechanism at least partially secured to the actuator, wherein the clamping mechanism is operable via the actuator. The clamping mechanism includes a movable jaw and a fixed jaw to slidably move a railroad pin away from a rail so as to be released from a base plate.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a railroad pin removal system for efficiently removing a pin from a base plate of a railroad system so as to free the rail from the base plate.

Another object is to provide a railroad pin removal system that is easy to operate and allows an individually to easily remove a pin from a railroad system.

An additional object is to provide a railroad pin removal system that is easy to maneuver to and from each individual base plate.

Another object is to provide a railroad pin removal system that is safe to operate.

A further object is to provide a railroad pin removal system that includes a trigger and trigger lock to prevent accidental engagement of the device.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
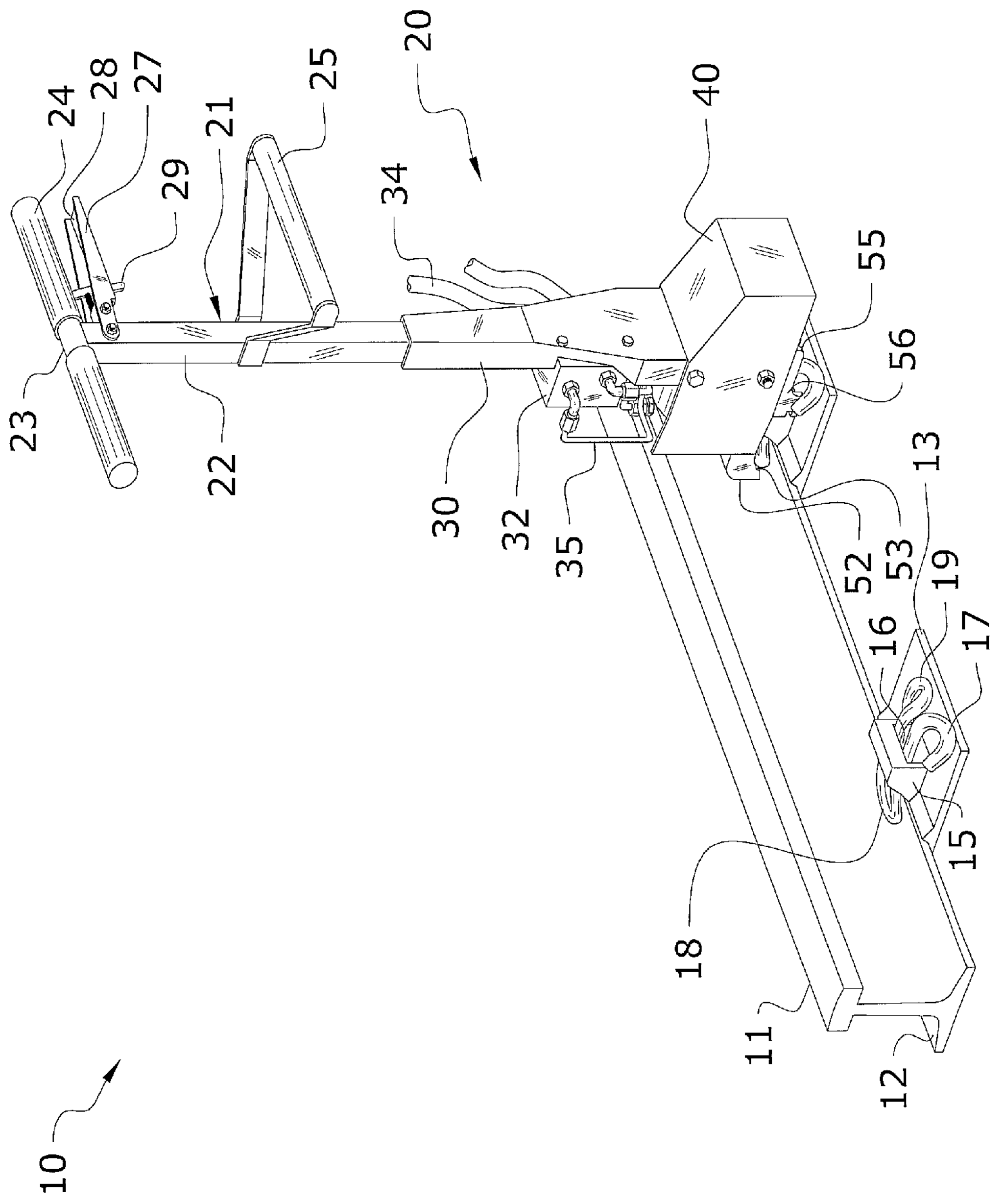
FIG. 1 is an upper perspective view of the present invention positioned over a railway pin.
Figure 2:
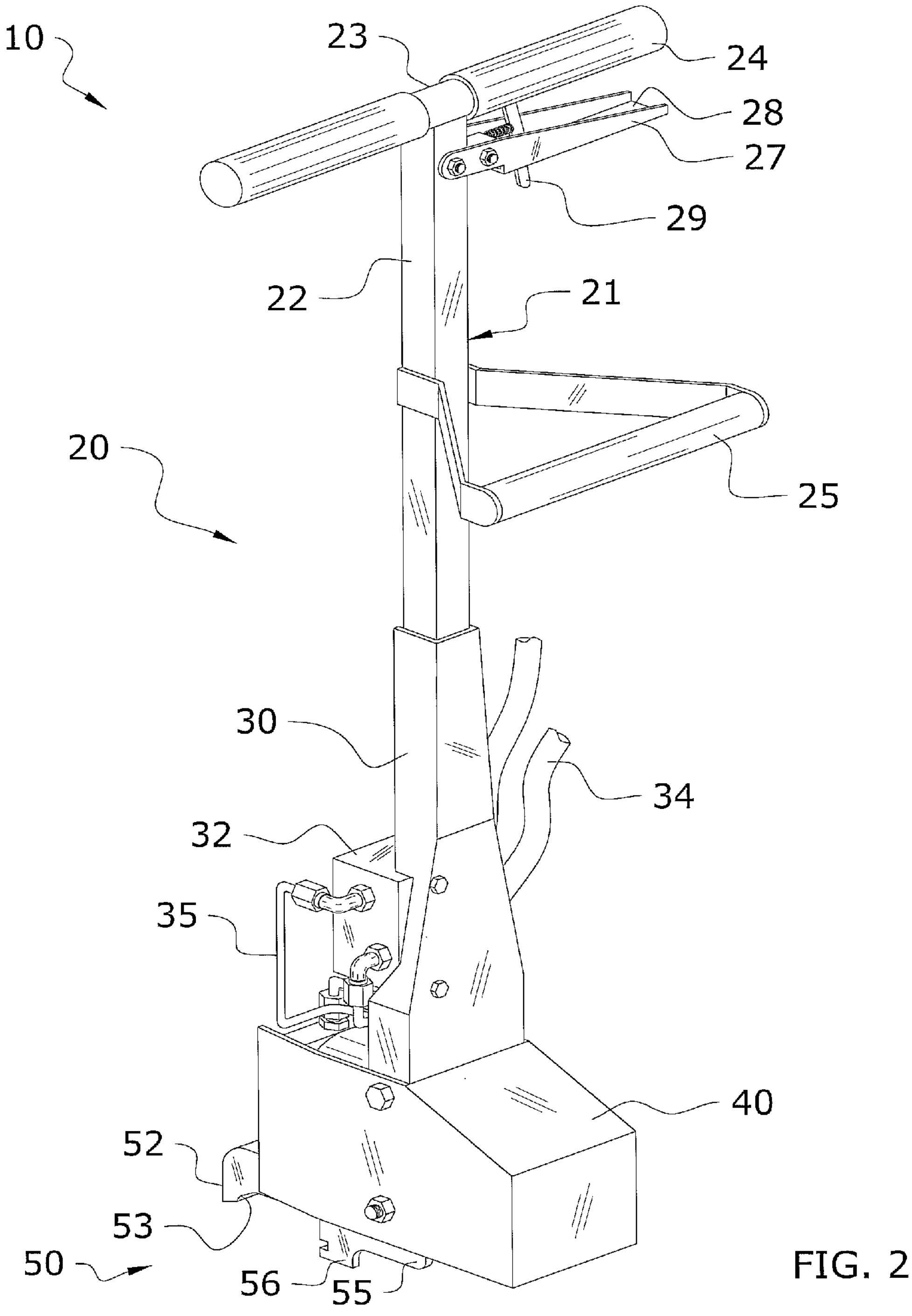
FIG. 2 is an upper perspective view of the present invention.
Figure 3:
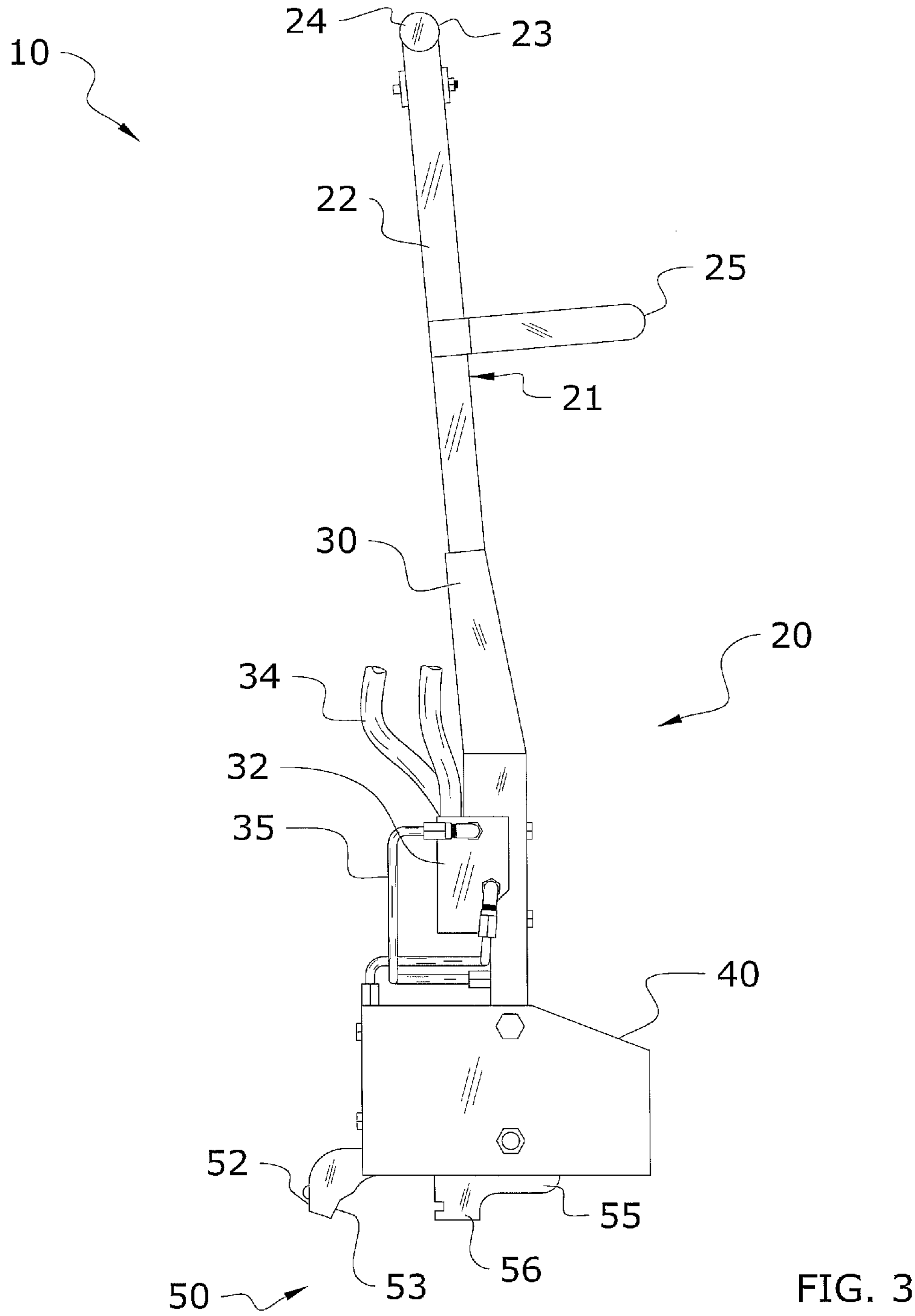
FIG. 3 is a side view of the present invention.
Figure 4:
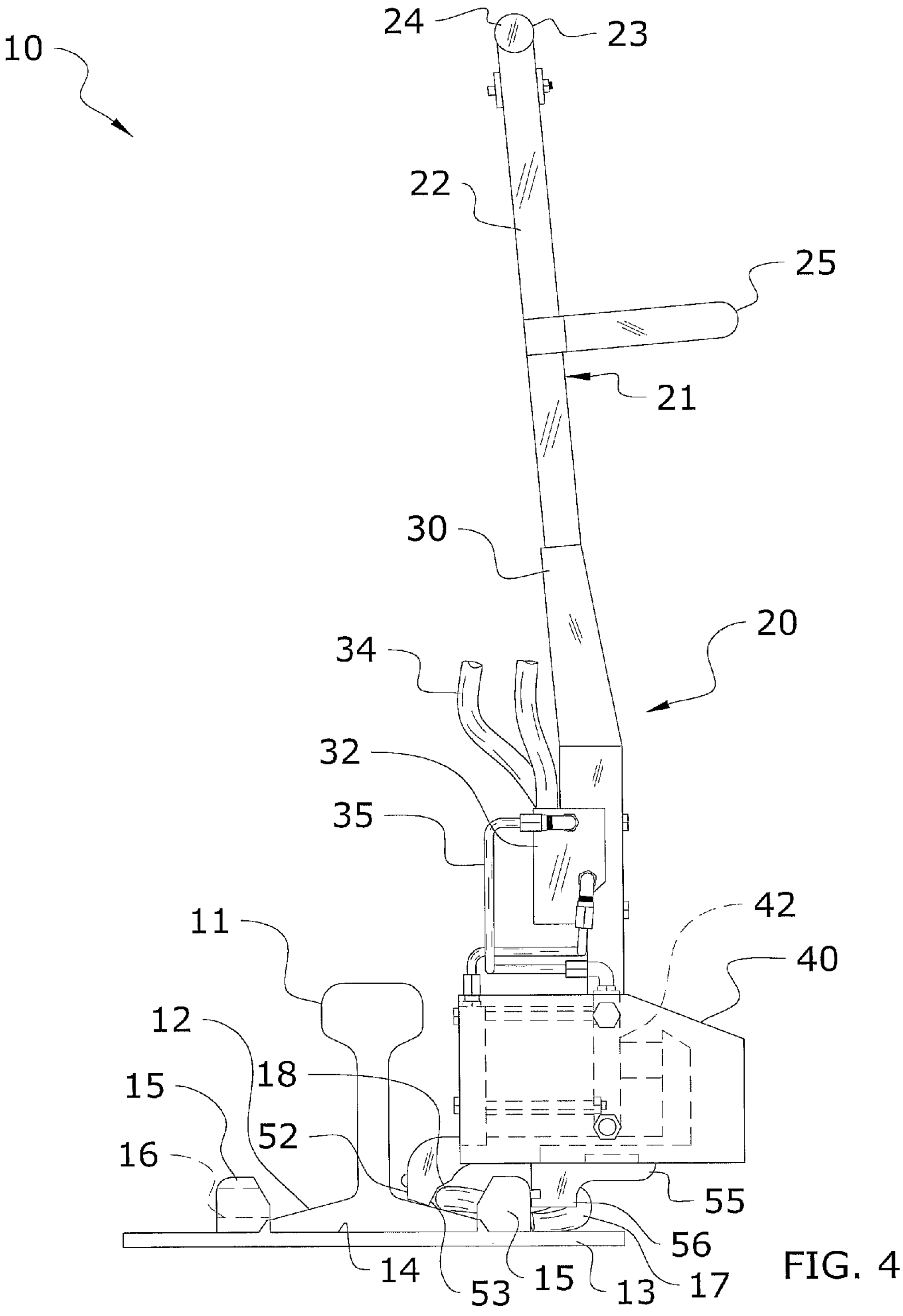
FIG. 4 is a side view of the present invention with the clamping mechanism in an initial position over a railway pin.
Figure 5:
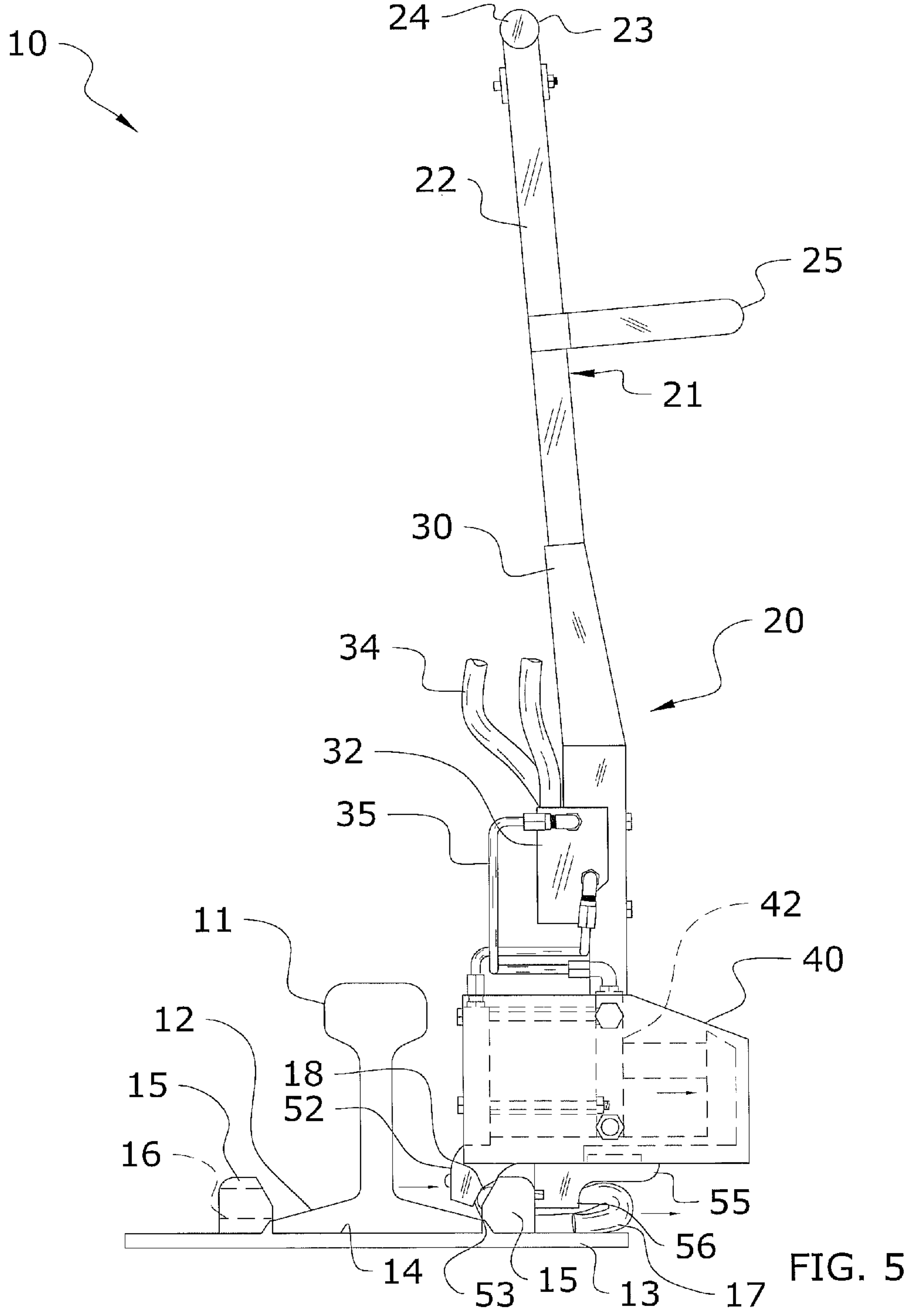
FIG. 5 is a side view of the present invention with the clamping mechanism pushing the pin away from the rail and through the retainer of the base plate.
Figure 6:
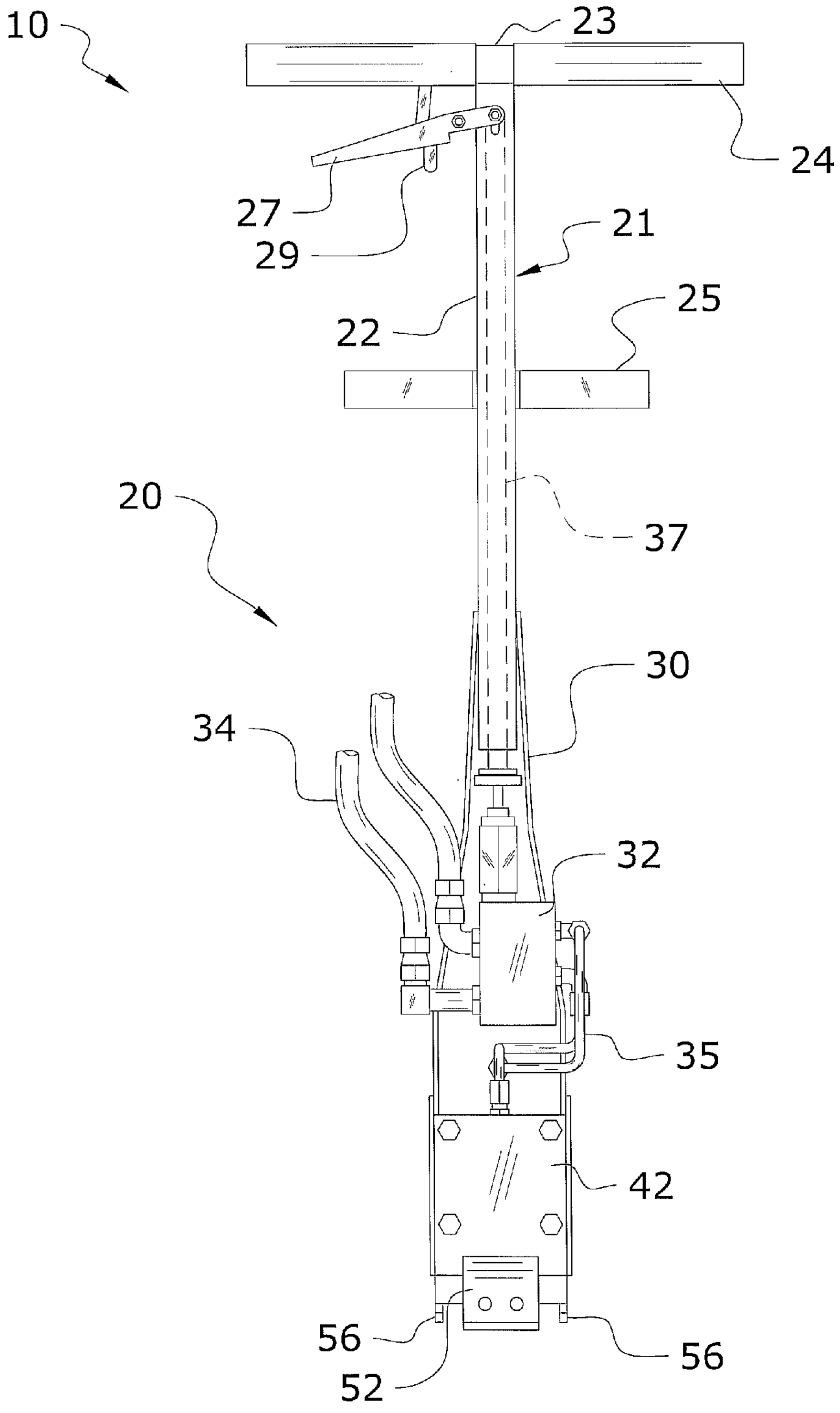
FIG. 6 is a front view of the present invention.
Figure 7:
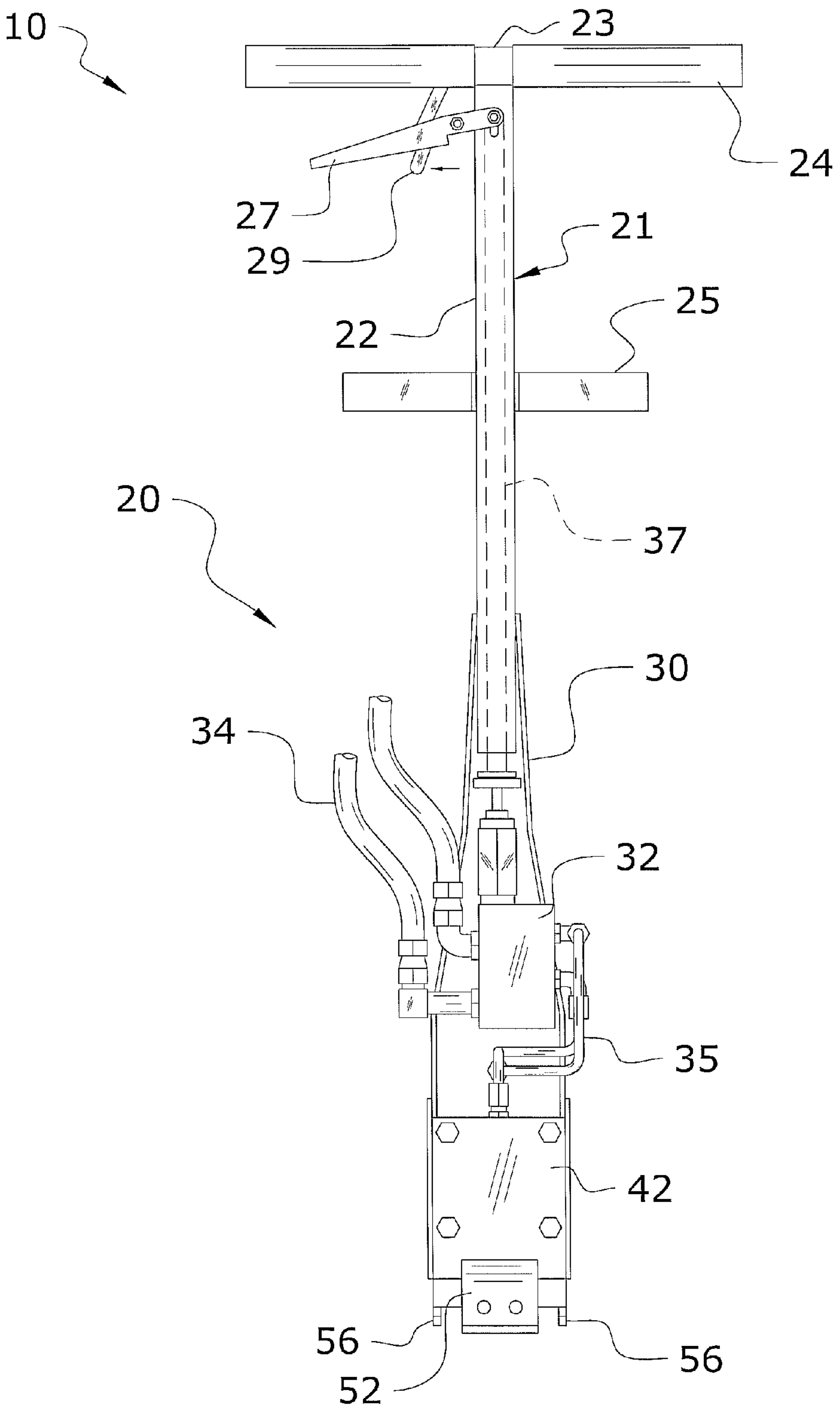
FIG. 7 is a front view of the present invention with the trigger lock being released from the trigger.
Figure 8:
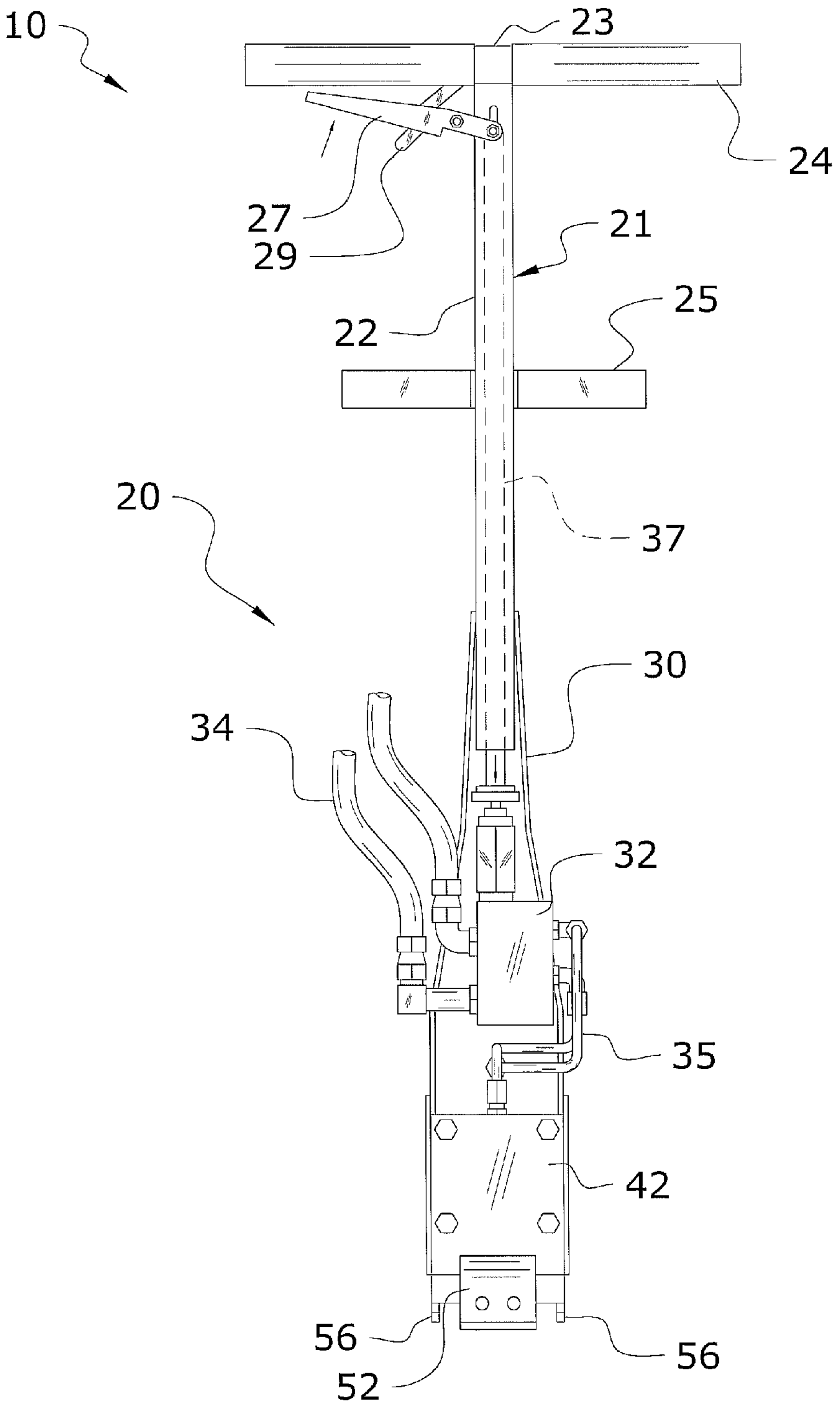
FIG. 8 is a front view of the present invention with the trigger lock released from the trigger and the trigger being depressed so as to activate the actuator.

Turning now descriptively to the drawings, in which similar reference characters denote similar elements throughout the several views, FIGS. 1 through 8 illustrate a railroad pin removal system 10, which comprises a frame 21, an actuator 42 secured to the frame 21 and a clamping mechanism 50 at least partially secured to the actuator 42, wherein the clamping mechanism 50 is operable via the actuator 42. The clamping mechanism 50 includes a movable jaw 52 and a fixed jaw 55 to slidably move a railroad pin 17 away from a rail 11 so as to be released from a base plate 13.

B. Railroad System

The railroad system may be assembled in various manners. Generally, the railroad system includes parallel rails 11 extending to form a track. The rails 11 are spaced apart consistently via a plurality of perpendicular ties (not shown). The rails 11 are connected to the ties or ground surface via a plurality of base plates 13. The base plates 13 include a flat receiving surface 14 to receiving the flat lower surface of the rails 11.

A pair of retainers 15 extend upwardly from the base plate 13 upon opposing sides of the rail 11 to secure the rail 11 upon the receiving portion 53 of the base plate 13 in a central position. The retainers 15 extend up and beyond a lower portion 12 of the rails 11. An opening 16 extends through the retainers 15 to receive a pin 17 or clip that is used to clamp the rail 11 down upon the base plate 13.

The pin 17 extends through the opening 16, wherein a first end of the pin 17 deemed the clamping portion 18 rests atop the lower portion 12 of the rail 11 to clamp the rail 11 down upon the base plate 13. A second end of the pin 17 deemed the securing portion 19 extends through the opening 16 upon an opposite side of the retainer 15 to secure the pin 17 within the opening 16. The pin 17 may be formed in various manners all which preferably allow the pin 17 to be removed by sliding through the opening 16 from a rail 11 side of the retainer 15 to an outer side. It is appreciated that although the pin 17 is just illustrated upon the outer side of the rail 11, a second pin 17 may also be positioned upon the retainer 15 along the inside of the rail 11.

C. Frame

The pin 17 is removed from the base plate 13 via a device 20 which will be described subsequently. The device 20 generally includes a frame 21 to support an actuator 42 and a clamping mechanism 50. The frame 21 is comprised of a stand-up configuration and includes a vertical member 22, a center support 30 extending from the vertical member 22 and a lower enclosure 40 extending from the center support 30. The frame 21 may also include various other supports and connectors as deemed necessary to provide a stable structure.

D. Handlebar

The device 20 includes a handlebar 23 preferably extending from an upper most end of the device 20. The handlebar 23 is connected to an elongated vertical member 22. The vertical member 22 may be slightly angled to allow for a user to more comfortably grasp the handlebar 23. The handlebar 23 and the vertical member 22 preferably form a T-shaped configuration. The handlebar 23 also preferably include grips 24 to allow for a more comfortable grasp of the handlebar 23 when utilizing the device 20.

A lower handle 25 may also be included with the device 20 and position upon the vertical member 22. The lower handle 25 is preferably positioned upon an intermediary point along the vertical member 22 and may be used for various purposes, such as when using the device 20 to remove the pin 17 or when transporting the device 20 from location to location. In the preferred embodiment, the lower handle 25 is comprised of an elongated tubular member; however other configurations may be appreciated.

E. Trigger

A trigger 27 is preferably positioned along the handlebars 23 to engage the clamping mechanism 50 of the device 20 for removal of the pin 17. The trigger 27 is preferably pivotally connected to the vertical member 22 or other portion of the device 20. The trigger 27 is also preferably formed to include a recessed portion 28 facing the handlebars 23. The recessed portion 28 is received by the handlebars 23 when the trigger 27 is fully engaged so that the trigger 27 may be positioned closer to the handlebars 23 and thus allow a user to more comfortably operate the device 20 by wrapping their hands around the trigger 27 and the handlebars 23.

The device 20 also preferably includes a trigger lock 29 to prevent accidental engagement of the trigger 27. The trigger lock 29 in the preferred embodiment preferably extends from the handlebars 23 and through the trigger 27. When positioned in a locked mode, the trigger lock 29 prevents the trigger 27 from being engaged via catching upon the trigger 27. When releasing the trigger 27 from the trigger lock 29, the trigger lock 29 is preferably pivoted away from the catching portion of the trigger 27 to allow the trigger 27 to pivot towards the handlebars 23.

F. Valve

A valve 32 or other activating mechanism is preferably positioned upon the device 20 and in the preferred embodiment is located along a center support 30 below the vertical member 22. The valve 32 may be comprised of various types of valve 32, such as but not limited to a block valve.

Various hoses extend from the valve 32 to receive fluid via supply hoses 34 or connect the valve 32 to the actuator 42 via connecting hoses 35. An external pump (e.g. hydraulic pump, etc.) is preferably connected to the hoses 34 on an opposite end as the valve 32. A connecting member 37 preferably extends through the center of the vertical member 22 to connect the trigger 27 to the valve 32. The connecting member 37 when vertically displaced via pivoting of the trigger 27 engages the valve 32 so as to engage the actuator 42 and subsequently clamping mechanism 50.

G. Actuator

The actuator 42 is used to move the clamping mechanism 50 and in the preferred embodiment is located within a lower enclosure 40 below the center support 30. The lower enclosure 40 preferably surrounds the actuator 42 to prevent the user from becoming caught in the actuator 42 and getting hurt.

The actuator 42 may be comprised of various types of actuating devices 20 capable of exerting large amounts of force to remove the pin 17 from the support plate, such as but not limited to hydraulic cylinders, rams, pneumatic cylinders or electric cylinders. The actuator 42 travels outwardly away from the rail 11 when activated, but yet remains within the lower enclosure 40.

H. Clamping Mechanism

A clamping mechanism 50 is movably operated via the actuator 42 to remove the pin 17 from the retainer 15 of the base plate 13. The clamping mechanism 50 extends below the lower enclosure 40 so as to engage the pin 17 and retainer 15. The clamping mechanism 50 preferably includes both a fixed jaw 55 and a movable jaw 52.

The movable jaw 52 extends around the clamping portion 18 of the pin 17 upon a side closes to the rail 11. The movable portion also includes a receiving portion 53 to receive the outer end of the clamping portion 18 of the pin 17 in a manner to prevent the movable portion from sliding away from the pin 17 when pushing the pin 17 towards the retainer 15. The receiving portion 53 may be comprised of various configurations, such as curved or flat, any of which match the shape of the outer end of the clamping portion 18 of the pin 17.

The fixed jaw 55 extends over a side of the retainer 15 opposite the rail 11 and clamping portion 18 of the pin 17. The fixed jaw 55 is preferably comprised of two outer plates 56 that rest against the retainer 15 in a manner so as to prevent the pin 17 from engaging the fixed jaw 55. The pin 17 is able to slide between the outer plates 56 of the fixed jaw 55 when the movable jaw 52 is pushing the opposing end of the pin 17 through the opening 16 of the retainer 15.

The movable jaw 52 (when activated) pushes the clamping portion 18 of the pin 17 toward the retainer 15 through the opening 16 of the retainer 15. The fixed jaw 55 secures the opposing end of the clamping mechanism 50 to the retainer 15 so as to provide a base point in which the movable jaw 52 can push against. The fixed jaw 55 may also include a notch to assist in securing the fixed jaw 55 to the retainer 15.

I. Operation of Preferred Embodiment

In use, the device 20 is maneuvered over the pin 17 so that the fixed jaw 55 is positioned over a side of the retainer 15 opposite the pin 17 and the movable jaw 52 is positioned over the clamping portion 18 of the pin 17 nearest the rail 11. The user then ensures to firmly grasp the handlebars 23 and stabilize the device 20. The trigger lock 29 may then be released from the trigger 27 and the trigger 27 depressed to engage the valve 32, the actuator 42 and the clamping mechanism 50 to release the rail 11 from the base plate 13 via pushing the pin 17 through the retainer 15 of the base plate 13. It is appreciated that the clamping mechanism 50 need only push the retainer 15 a suitable distance to clear the rail 11 of the pin 17 so that the rail 11 may be removed or adjusted in position.

Once the pin 17 is pushed an adequate distance away from the rail 11, the trigger 27 is released thus allowing the trigger lock 29 to relock the trigger 27 and moving the clamping mechanism 50 to an initial position so as to easily move the device 20 away from the pin 17 and base plate 13. This process may simply be repeated for further removal of pins 17 from base plate 13 along the rail 11.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A railroad pin removal system, comprising:
- a frame, wherein said frame includes a trigger, wherein said frame includes a lower enclosure;
- an actuator secured to said frame; and
- a clamping mechanism at least partially secured to said actuator, wherein said clamping mechanism is operable via said actuator;
- wherein said clamping mechanism includes a movable jaw and a fixed jaw to slidably move a railroad pin away from a rail so as to be released from a base plate, wherein said movable jaw is comprised of an “S” shape, wherein said movable jaw is installed under said actuator, wherein said actuator is adapted to force a first end of said movable jaw away from said fixed jaw and a second end of said movable jaw toward said fixed jaw.

2. The railroad pin removal system of claim 1, wherein said movable jaw includes a receiving portion.

3. The railroad pin removal system of claim 2, wherein said receiving portion is comprised of a curved configuration.

4. The railroad pin removal system of claim 1, wherein said fixed jaw is comprised of a pair of outer plates.

5. The railroad pin removal system of claim 1, wherein said trigger includes a trigger lock.

6. The railroad pin removal system of claim 1, including a handlebar extending from said frame near an upper end of said frame.

7. The railroad pin removal system of claim 6, including a lower handle extending from said frame below said handlebar.

8. The railroad pin removal system of claim 1, wherein said frame includes a vertical member proximate an upper end of said frame.

9. The railroad pin removal system of claim 8, wherein said vertical member angles outwardly.

10. A railroad pin removal system, comprising:
- a rail;
- a base plate to receive said rail, wherein said base plate includes a pair of spaced apart retainers in which said rail is positioned between;
- wherein said retainers each include an opening;
- a pin extending within said opening and over a lower portion of said rail to clamp said rail to said base plate;
- a device for removing said pin from said base plate, wherein said device includes a lower enclosure;
- an actuator secured to said device, wherein said actuator is fully enclosed within said lower enclosure;
- a valve fluidly connected to said actuator by one or more connecting hoses, wherein said one or more connecting hoses each extend into said lower enclosure;
- a hydraulic pump fluidly connected to said valve; and
- a clamping mechanism secured to said device, wherein said clamping mechanism is operable via said actuator;
- wherein said clamping mechanism includes a movable jaw and a fixed jaw to slidably move said pin away from said rail so as to release said rail from said base plate, wherein said movable jaw is comprised of an “S” shape, wherein said movable jaw is installed under said actuator, wherein said actuator is adapted to force a first end of said movable jaw away from said fixed jaw and a second end of said movable jaw toward said fixed jaw.

11. The railroad pin removal system of claim 10, wherein said movable jaw includes a receiving portion.

12. The railroad pin removal system of claim 11, wherein said receiving portion is comprised of a curved configuration.

13. The railroad pin removal system of claim 10, wherein said fixed jaw is comprised of a pair of outer plates.

14. The railroad pin removal system of claim 10, including a trigger to activate said actuator.

15. A railroad pin removal system, comprising:
- a frame;
- wherein said frame includes a vertical member positioned proximate an upper end of said frame, a center support extending from said vertical member and a lower enclosure extending from said center support;
- a handlebar connected to said vertical member; a trigger positioned proximate said handlebar; an actuator secured to said frame fully enclosed within said lower enclosure;

a valve fluidly connected to said actuator by one or more connecting hoses, wherein said one or more connecting hoses each extend into said lower enclosure;

a connecting member extending within said vertical member, wherein said connecting member connects said trigger to said valve; and a clamping mechanism at least partially secured to said actuator, wherein said clamping mechanism is operable via said actuator;

wherein said clamping mechanism includes a movable jaw and a fixed jaw to slidably move a railroad pin away from a rail so as to be released from a base plate, wherein said movable jaw is comprised of an "S" shape, wherein said movable jaw is installed under said actuator, wherein said actuator is adapted to force a first end of said movable jaw away from said fixed jaw and a second end of said movable jaw toward said fixed jaw.

* * * * *